(12) United States Patent
Raghuramu et al.

(10) Patent No.: US 12,395,514 B2
(45) Date of Patent: *Aug. 19, 2025

(54) NETWORK PORTION RISK ASSESSMENT

(71) Applicant: FORESCOUT TECHNOLOGIES, INC., San Jose, CA (US)

(72) Inventors: Arun Raghuramu, Milpitas, CA (US); Aveek Kumar Das, Santa Clara, CA (US); Yang Zhang, Fremont, CA (US)

(73) Assignee: Forescout Technologies, Inc., San Jose, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 17/694,448

(22) Filed: Mar. 14, 2022

(65) Prior Publication Data

US 2022/0201032 A1 Jun. 23, 2022

Related U.S. Application Data

(63) Continuation of application No. 16/583,023, filed on Sep. 25, 2019, now Pat. No. 11,310,258.

(60) Provisional application No. 62/831,118, filed on Apr. 8, 2019.

(51) Int. Cl.
*H04L 9/40* (2022.01)
(52) U.S. Cl.
CPC ...... *H04L 63/1433* (2013.01); *H04L 63/0227* (2013.01); *H04L 63/102* (2013.01)

(58) Field of Classification Search
CPC ... H04L 63/0227; H04L 63/102; H04L 63/14; H04L 63/1408; H04L 63/1433; H04L 63/1416; H04L 63/1425; H04L 63/1441; H04L 63/1458
See application file for complete search history.

(56) References Cited

U.S. PATENT DOCUMENTS

| | | | |
|---|---|---|---|
| 6,301,668 B1 * | 10/2001 | Gleichauf | ........... H04L 63/1433 726/25 |
| 8,181,240 B2 | 5/2012 | Jonnala et al. | |
| 11,310,258 B2 * | 4/2022 | Raghuramu | .......... H04L 63/102 |
| 2006/0095961 A1 | 5/2006 | Govindarajan et al. | |

(Continued)

OTHER PUBLICATIONS

Transmittal of International Preliminary Report on Patentability mailed on Sep. 28, 2021, for International Application No. PCT/US2020/026850, filed Apr. 6, 2020, pp. 8.

(Continued)

*Primary Examiner* — Paul E Callahan
(74) *Attorney, Agent, or Firm* — Womble Bond Dickinson (US) LLP

(57) ABSTRACT

Systems, methods, and related technologies for determining a risk associated with a network portion are described. The determination of risk associated with a network portion may include accessing network traffic from a network and determining an entity type associated with at least one entity communicatively coupled to the network. A network portion associated with the at least one entity can be determined. A risk associated with the at least one entity can be determined. A risk associated with the network portion associated with the at least one entity can be determined based on the risk associated with the at least one entity. The risk associated with the network portion can then be stored.

20 Claims, 9 Drawing Sheets

(56) References Cited

U.S. PATENT DOCUMENTS

| | | |
|---|---|---|
| 2006/0101517 A1* | 5/2006 | Banzhof ............ H04L 63/1433 |
| | | 726/25 |
| 2017/0250823 A1 | 8/2017 | Glenn |
| 2018/0091540 A1 | 3/2018 | Solow et al. |
| 2018/0159890 A1 | 6/2018 | Warnick et al. |
| 2019/0394224 A1 | 12/2019 | Hamdi |

OTHER PUBLICATIONS

Transmittal of the International Search Report and Written Opinion of the International Searching Authority mailed on Sep. 15, 2020, for International Application No. PCT/US2020/026850, filed Apr. 6, 2020, pp. 12.

Liang, L. et al. (2012). "Novel Method of Assessing Network Security Risks Based on Vulnerability Correlation Graph," 2012 2nd International Conference on Computer Science and Network Technology, 1085-1090.

Ge, M. et al. (2017). "Security Modeling and Analysis of Cross-Protocol IoT Devices," IEEE Computer Society, 1043-1048.

* cited by examiner

NETWORK PORTION RISK ASSESSMENT

CROSS-REFERENCE TO RELATED APPLICATION

This application is a continuation of U.S. application Ser. No. 16/583,023, and entitled "NETWORK PORTION RISK ASSESSMENT," filed on Sep. 25, 2019, which claims the benefit of and priority to U.S. Provisional Application No. 62/831,118, and entitled "ATTACK SURFACE MINIMIZATION," with filing date Apr. 8, 2019, and is hereby incorporated by reference in its entirety.

TECHNICAL FIELD

Aspects and implementations of the present disclosure relate to network monitoring, and more specifically, determining risk associated with various portions and systems of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
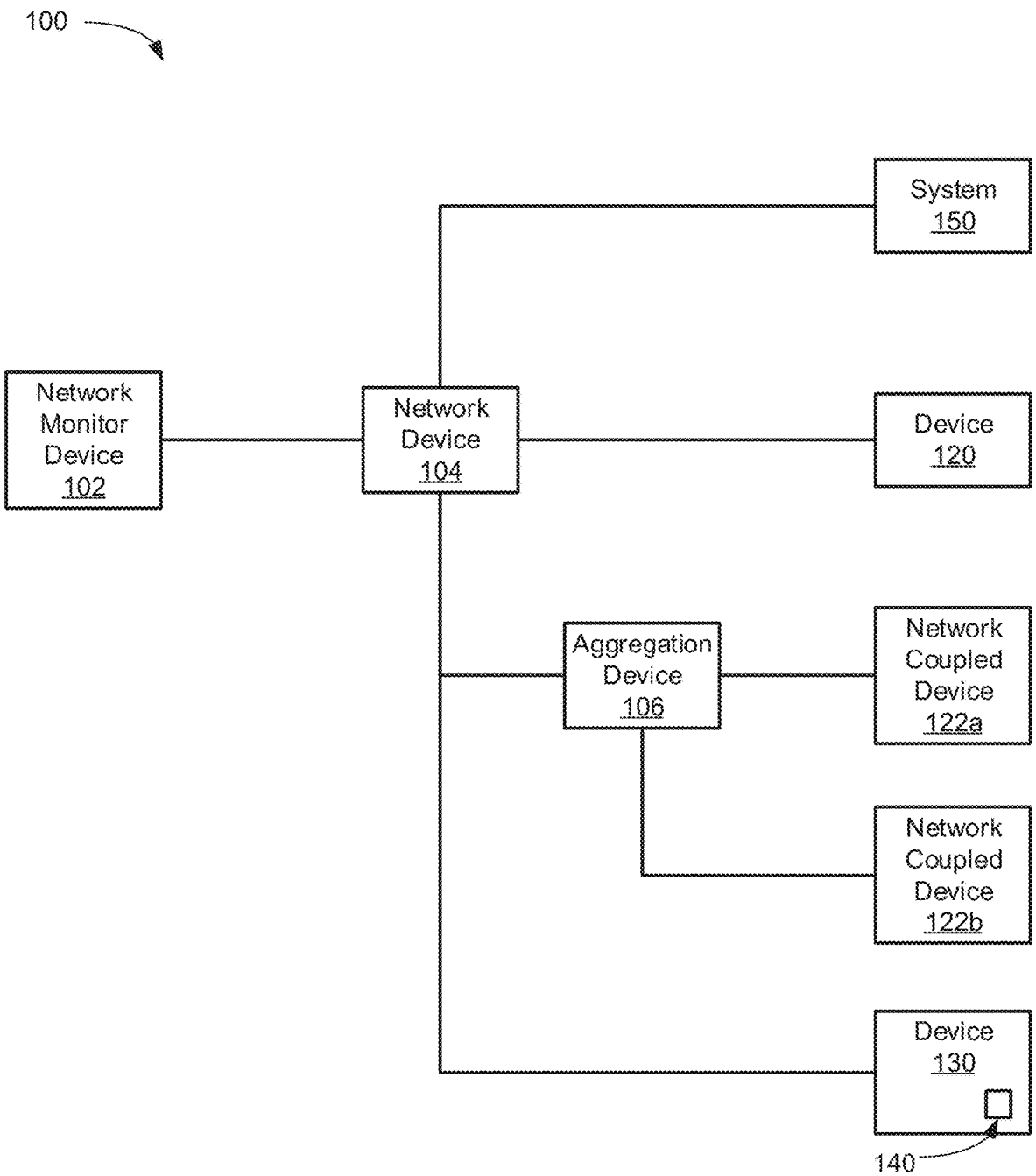
FIG. 1 depicts an illustrative communication network in accordance with one implementation of the present disclosure.

Aspects and implementations of the present disclosure are directed to risk analysis or risk determination for various portions of a network (e.g., virtual local area network (VLAN), service set identifier (SSID), segment, etc.) and reporting that includes device type and sensitivity aspects. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (internet protocol (IP) cameras), wearable devices, medical devices, etc.) in both information technology (IT) and operational technology (OT) environments can make it difficult to effectively ensure that network security is maintained. Accordingly, described herein in various implementations are systems, methods, techniques, and related technologies, which allow for determining a risk for a network portion (e.g., VLAN, SSIDs) and optionally taking one or more actions based on the risk associated with the portion of the network.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the traffic flowing between the devices.

Network segmentation or segmentation is an important measure to limit the attack surface in any network environment. The attack surface is the sum of the different points where an unauthorized user or attacker can try to gain access to an environment. These points for potential entry can be exploited by attackers to disrupt network performance, capture personal data, introduce malware into the network, etc. Maintaining an attack surface that is as small as possible is an essential network security measure. Network segmentation is the process of logical separation of a computer network into subnetworks. This type of network splitting has many advantages including boosting network performance, containing network problems, and improving security posture. From a security perspective, implementing network segmentation creates an environment of least privilege.

Segmentation is often achieved by a combination of different techniques at Layer 2 and Layer 3 of the networking stack in the OSI model, including deploying virtual local area networks (VLANs), subnetting, access control lists (ACLs), and firewalling. The need and importance of network segmentation is more pronounced in environments with sensitive and easily exploitable internet of things (IoT) devices and data (e.g., hospital networks or financial institutions).

At the Layer 2 level, using VLANs is a common methodology to partition broadcast domains. Communication between VLANs are then limited using Layer 3 techniques, such as using a firewall or an ACL. For example, there may be two separate VLANs in an organization, one for the engineering network and the other for human resources (HR). Employees in the HR department would be limited in their access to the engineering network using a firewall. In some cases, there may be filtering within a VLAN (e.g., using VLAN ACLs (VACLs)).

In healthcare networks, there are a variety of devices with sensitive information including heart rate monitors, X-ray machines, medicine cabinets, and pharmacy systems. Many of these systems running older and vulnerable operating systems (e.g., Windows XP™) and are rarely patched, leaving them vulnerable to IoT malware and ransomware attacks.

One protection against the spread of such emerging threats is the practice of proper IoT network segmentation. Network segmentation/network isolation helps minimize the attack surface of the network and increases the cost for the attacker to move laterally through the network.

Neighboring devices or peer devices in a network portion (e.g., VLAN, SSID, area associated with a switch, or network segment) of a device can have a significant impact on the security of a device. Each of the multiple devices in a network portion may have their own respective security vulnerabilities meaning the attack surface of a network portion can be a combination of each of the individual risks of each device. The ability of peer or neighboring devices to communicate can further increase the risk because this ability to communicate can allow an attack or compromise to spread among multiple different types of devices. For example, if a highly sensitive device, such as a healthcare patient monitor or an infusion pump is on the same VLAN as another OT device, for instance an IP camera, having an HTTP login interface, this can present a significant security threat and possibly create risk for a patient. Thus, the network portion (e.g., VLAN) where a device is connected can directly affect its attack surface.

For example, for a given VLAN, while dependent on the number of devices, the security is a function of how the VLAN is designed. This design includes the functions or devices types of the VLAN as well as what communications are allowed with other VLANs. For example, access control rules or other rules can function to limit the communications of a VLAN. If the VLAN communications controls, e.g., access control lists (ACLs), are not configured well, then the VLAN may be vulnerable to attack even though the device types of a VLAN are well defined and organized.

A network may be organized in a variety of ways or configurations. How the network is organized will impact the security posture, attack surface, or a combination thereof. For example, if each of the devices of a network are in a single VLAN, the attack surface will be very large because each device will be able to communicate with the other devices and attacks will be able spread between or among the devices.

An entity or entities, as discussed herein, include devices (e.g., computer systems, for instance laptops, desktops, servers, mobile devices, IoT devices, OT devices, healthcare devices, financial devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment) and restricting communications between one or more network portions. Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

Embodiments are able to minimize the attack surface by organizing network portions by entity context (e.g., entity type, function, purpose, etc.) and risk. Embodiments may do this through the separating entities through network portions (e.g., VLANs) for each entity context. The entity contexts may be determined based on identifications, classifications, or combination thereof, of devices by embodiments. For example, for a hospital, the infusion pump devices and devices with similar or related functions may be assigned or put into a single network portion.

Embodiments are able to identify sensitive entities and sensitive entities types that are at risk when on a default VLAN. For example, indications when sensitive entities are present on the default network portion, for instance, the default VLAN. The default VLAN can include control plane traffic which a malicious device can tamper with to cause disastrous consequences, e.g., deletion of a VLAN database, performing VLAN hoping attacks, changing the root bridge, etc.

Embodiments provide visibility into the network structure, e.g., network portions, and the entity types, e.g., of each network portion. Embodiments can minimize the attack surface by monitoring or observing network traffic (e.g., via a SPAN port) to determine the entity types. The network structure, e.g., network portions (e.g., VLANs, SSIDs, etc.), can be determined by observing network traffic. The network traffic can further be used to determine which entities are associated with each network portion and which network portions are able to communicate with which other network portions. Embodiments support environments where multiple SSIDs are associated with a VLAN and environments where multiple VLANs are associated with an SSID.

Embodiment may support certain entity types being evaluated as high sensitivity, moderate sensitivity, or low sensitivity. The level of sensitivity of an entity can be based on the kind of personally identifiable information (PII), financial, or other sensitive information that the entity accesses, processes, etc. The sensitivity levels may be defined by a user (e.g., on an organization or environment basis), by entity type or function, as part of a policy, or by default.

For example, a regular office printer may be considered low sensitivity, while a magnetic resonance imaging (MRI) printer or other health information based printer may have be high sensitivity due to the medical information that the printer is processing, accessing, etc. As another example, an IP camera that records people may be considered high sensitivity because a compromise of the IP camera would result in a live feed of one or more people. In an industrial environment, an industrial control system and a SCADA server may be considered high sensitivity. Safety systems, e.g., of one or more fire sensors and an alarm, can be high sensitivity due to the risk to human life. A workstation or server that has customer information or financial information may be high sensitivity due to the importance of the financial and customer information. A reception computer may be low risk because of the limited information that the computer contains or can access. The sensitivity may thus be based on what information the entity has (e.g., stored on local storage) or has access to (e.g., on file shares, network based storage, servers, applications, etc.).

An entity may be considered moderate sensitivity based on the information being of moderate importance or value (e.g., as compared to the highest sensitivity information). For example, a device used for people to sign in for a waitlist in a hospital or doctor's office may be moderate sensitivity because it does not have direct healthcare information, dosage information, or other medical information. As another example, a device with employee names, employee email addresses, and employee phone numbers might be moderate sensitivity due to the information being less sensitive than the highest level of sensitivity. In contrast, an HVAC system of an office building or conference room may be low or moderate sensitivity for an office building. An HVAC system for a data center may be high sensitivity.

Healthcare entities may be particularly sensitive because they contain sensitive patient-related information as well as devices that are directly connected to the patient. For example, where sensitive medical equipment has been put in a network portion with other different types of device, for instance IP cameras, this situation creates risk for the sensitive medical devices. Example healthcare devices include patient monitors, medication dispensing systems, pneumatic tube systems, x-ray machines, and healthcare workstations. Other entities may be considered sensitive based on dealing with, accesses, processing, etc., personal information, health information, financial information, etc. For example, point-of-sale (POS) devices may be considered sensitive due to commonly dealing with personal financial information of users or customers.

Embodiments may further identify a situation where a device is put on a network portion that is a misconfiguration or a mistake. This can be based on detecting a network portion with an unintended/anomalous entity mix. For example, if a network portion (e.g., VLAN) has 300 financial services devices (e.g., ATMs, teller machines, POS devices, etc.) and a single IP camera, this may be identified as the IP camera being mistakenly put in a financial services network portion. This identification may be based on a relatively large number of a single or a few entity types, functions, or purposes and a relatively small number of devices of a different or dissimilar entity type, function, or purpose.

Other devices that should not be mixed with sensitive devices include: uninterruptable power supply (UPS), clocks, IP cameras, personal devices, for instance, a smartwatch, building automation devices or unrelated traditional information technology (IT) devices. Traditional IT devices can include computers, printers, servers, VOIP devices, mobile phones, tablets, TVs, etc.

Embodiments are able to remedy situations where the attack surface of a network portion or an entity increases as the number of different types of entities or the number of vulnerabilities of the entities of the network portion increases. For example, healthcare devices may be put at risk due to other non-healthcare devices (e.g., IP camera, personal devices, etc.) being able to communicate with or being in the same network portion as the healthcare devices (and further the non-healthcare devices having vulnerabilities). As another example, a VOIP device that communicates with the Internet should not be in the same VLAN as an X-ray machine which is only supposed to communicate with a local file server. Embodiments are thus able to identify instances where a user should reconfigure their network portion (e.g., VLANs, SSIDs, switches, etc.) or make sure that the devices on a network portion are secure. Embodiments may further store risk information (e.g., risk state information) for entities and network portions to be able to provide analytics, e.g., including trends, of a network.

Embodiments can use classification functionality (e.g., based on passive scanning, active scanning, or a combination thereof) to identity and assess risk of network portions based on the types of entities in the network portion. This enables network security personnel and teams to prioritize and address the most at risk network portions first. Embodiments further allow combining security posture risk analysis (e.g., based on weak or default credentials) with information of the different types of devices on a network portion.

Embodiments combine network portion configuration (e.g., VLAN assignment) and risk assessment, e.g., of entities and network portions, to reduce the attack surface of a network. This may be done a network portion by network portion basis. Embodiments are further able to use classification information, identification information, or combination thereof along with the associated network portion (e.g., VLAN) to make risk determinations about network portions which enable taking actions and drawing attention to allow prioritization of the one or more possible network portions changes. Embodiments are thus able to bring attention to the how an entity contributes to network portion risk, network portion sensitivity, and the security posture of a network portion. For example, a single device with one or more high risk vulnerabilities can increase the risk of an entire network portion.

A risk score or risk associated with each network portion can then be determined based on the individual risk for each entity, entity type information, the network structure, sensitivity, other factors, or a combination thereof, as described herein. The network portions may then be configured (e.g., automatically—without human involvement or based on user input) and entities assigned to different network portions. This may be based on device context, sensitivity, device risk, etc., as described herein. For example, devices may be moved or assigned to different VLANs based on the device type.

Embodiments can use information associated with identifying or classifying entities or network portions (e.g., VLANs, SSIDs, switches, or network segments) to determine risk based on the different types of entities on a network portion with sensitive (e.g., a financial information processing devices) or critical devices (e.g., medical devices) in a single network portion. For example, an IP camera being vulnerable in a network portion can increase the risk to neighboring sensitive medical devices due to being in the same network portion. Actions may then be performed to reduce the security risk for the sensitive entities or entities that have the function or purpose that is associated with the network portion. The security risk may thus be determined on a per network portion basis and be based on the mixture of the devices in a network portion.

In some embodiments, the particular entity types may be associated with a level of high risk, moderate risk, or low risk (e.g., based on a determination of risk). Device types may further be associated with a high sensitivity, a moderate sensitivity, or a low sensitivity. A policy can then be performed whenever a device in that is associated with high risk is in the same network portion as a high sensitivity device type, this is flagged as a problem, one or more actions performed, or a combination thereof. Embodiments thus support detection of risk network portions based on entities having various levels of risk and various sensitivity levels.

Embodiments may further determine whether a high risk network portion can communicate with a high sensitivity network portion and change the network portion design to prevent such communication. In some embodiments, this may be done by accessing and analyzing access control lists (ACLs), enforcement points, segmentation infrastructure, or combination thereof to determine if a high risk network portion is being allowed to communicate with a high sensitivity network portion. Embodiments further support observing or monitoring network traffic between network portions to determine whether network portions can communicate. For example, traffic between a high risk network portion and a high sensitivity network portion can be monitored to determine whether the high risk network portion and the high sensitivity network portion should be isolated or not allowed to communicate.

The communications allowed between network portions may be displayed graphically. For example, a matrix or table may be used to show which groups of entities or network portions are communicating or able to communicate with each other.

Embodiments may further base risk base on identifying entities that can be logged into using default credentials or basic credentials (e.g., user: admin, password: admin). Such entities may present a significant security risk by themselves and an even larger risk when they are in the same network portion as critical or sensitive devices (e.g., healthcare or financial devices).

The determination of risk for each entity may be based on the equation:

$$risk = impact * probability$$

Where impact is the impact that an event will have and probability is the likelihood of an event occurring. Other equations or risk metrics may be used and are supported by embodiments.

In response to a risk associated with an entity (e.g., based on one or more vulnerabilities and above a threshold), embodiments may automatically isolate selected entity types (e.g., based on a high risk vulnerability).

The impact value used in the above equation may be based on the entity being classified as high risk, moderate risk, or low risk. Whether an entity is high risk, moderate risk, or low risk can be based on the number of vulnerabilities available for the device. An entity may be classified as high risk based on one or more Common Vulnerabilities and Exposures (CVEs) associated with the entity. For example, a device may be classified as high risk based on the software version running on the device being associated with one or more CVEs with high or critical associated Common Vulnerability Scoring System (CVSS) scores. As another example, a device running the newest patched software version may not be impacted by the CVEs and may be classified. In some embodiments, the risk score is based on the number of vulnerabilities present for a given software version of a given device type. For example, a camera running a Linux™ operating system version with 51 vulnerabilities may be given a score of 50. The impact part of the score may be normalized to between 1-100 or 0-100.

Weak or default credentials may be associated with high risk and high impact because of the significant risk of an attack (e.g., by an attacker or an automated program based attack, for instance, a botnet) and the entity may be compromised from anywhere. For example, if a device has weak or default credentials as determined by embodiments (e.g., by attempting to login with weak or default credentials, for instance, selected based on the classification of the device), the impact value may be large because of the significant impairment to a device that may occur because of an attacker logging into the entity and being able to control and modify the configuration of the entity.

Further, embodiments may identify a device that may have few or no vulnerabilities, which would otherwise make it low risk, as high risk based on the device having default or weak credentials. In response to weak or default credentials, one or more actions performed can include blocking access of the device to the rest of the network, quarantining, patching the device if the patching will change the default credentials and sending a notification of a change in the credentials due to the patch.

Probability is how probable an attack will occur. The probability may be a function of how many entities that are in a network portion and how many vulnerabilities there are among the entities in the network portion. For example, if a network portion has 10,000 cameras each with a single vulnerability, there is a higher probability of an attack than if the network portion has 100 devices each with two vulnerabilities.

As another example, embodiments may determine a probability associated with an entity based on the entity having default or weak credentials. Such an entity may be have a high probability of attack due to the number or variety of attacks that can be launched against an entity with default or weak credentials. It is appreciated that weak or default credentials usually may have a CVE associated therewith.

Embodiments may further incorporate monetary or financial risk into the risk score. The monetary or financial risk may reflect the cost of downtime of a plant, a portion of a plant, or other part of a business. The use of the monetary or financial risk enables the financial perspective to be considered and the potential cost of the risk to materialize to be considered. Embodiments support display of the risk based on the cost for each entity and each network portion.

The monetary impact may be based on a dollar value (e.g., input by a user) for any level of a business. For example, revenue for a particular location or part of a location (e.g., one or more production lines) may be used. The average cost of unplanned downtime for manufacturing facilities is estimated to be approximately $260,000 per hour. For example, the monetary impact may be based on the amount of revenue a manufacturing plant makes or amount of revenue a manufacturing plant makes for a single production line. In the case of the amount of revenue for a production line, that monetary impact may apply to those entities or devices that are part of the production line. The incorporation by embodiments of monetary information allows comparisons between two different portions of a business (e.g., plants, production lines) to allow remediation of risk where more revenue or other financial metrics are at stake. Embodiments may support additional monetary or financial related factors.

By determining the sensitivity and risk for each entity, embodiments are operable to determine when a high risk entity is in a network portion with a high sensitivity entity and perform one or more actions, as described herein. The one or more actions may include changing a network portion of the high risk device by assigning or changing it to another network portion (e.g., VLAN) or to a quarantine network portion. The one or more actions may include changing the network portion of the high sensitivity device to another network portion, e.g., when the high sensitivity device is with several different device types, one or more with high risk, in a network portion.

Embodiments can support configuring a network so that network portions are configured based on the risk level of the entities in the network portion. For example, embodiments may configure (e.g., automatically) the network portions such that there is a high risk VLAN, a moderate risk VLAN, and a low risk VLAN, each including entities with the associated risk level. Embodiments may further allow iteratively reconfiguring network portions according to entity type, sensitivity, risk, etc., to achieve the desired network segmentation.

After separating the entities into separate network portions (e.g., VLANs), embodiments may configure the access privileges between the various network portions. The configuration may include configuring which network portions are able to communicate with other network portions and which network portions are prevented from communicating. Embodiments may further configure communications rules between the network portions. For example, after X-ray machines have been moved to a single VLAN, the VLAN may be isolated from communicating with other VLANs that do not include a file server for storing X-ray images or communicating with the Internet.

Embodiments thus are able to reduce the attack surface of networks along with providing feedback (e.g., visually to a user) in terms of entity visibility and the associated network structure. The feedback allows quick evaluation of risk associated network portions and evaluation of the devices contributing to the risk associated with a network portion.

In some embodiments, the risk and sensitivity level for each device may be displayed. The risk and sensitivity level of each network portion may be displayed. The change in risk to each network portion may be displayed, as one or more entities are assigned or moved to different network portions or the communications configuration of a network portion changes. As each network portion assignment or change is made, feedback can be provided (e.g., visually) to indicate the risk of each network portion and the risk associated with each entity. Embodiments are thus able to provide feedback as changes to the network configuration are made.

Embodiments are able to provide visibility into the risk of a network portion relative to other network portions. Sensitive or critical entities can be identified and visually flagged (e.g., with a red icon or other indicator) when within a network portion that has non-sensitive, non-critical devices, or vulnerable devices (e.g., above a risk threshold). Such a situation can be used as a basis for prioritizing or automating one or more actions, including notifying an administrator or automatically changing a VLAN assignment of a vulnerable device.

Embodiments can further take one or more actions based on risk scores or risk assigned to each network portion. The actions can include changing the network portion (e.g., VLAN) that a device is assigned to and thereby changing risk associated with a network portion. Actions can further include changing the communications configuration of a network portion (e.g., which network portion(s) a network portion is able or allowed to communicative with). For example, one action can include preventing Internet access from a network portion with a risk score above a certain threshold. Embodiments thus support minimizing the network attack surface by detecting a risky VLAN, taking one or more actions to reduce or eliminate the risk, and optionally verifying that the one or more actions reduced or eliminated the risk. The risk associated with a network portion can then be recomputed or determined to confirm that the risk associated with the network portion has been lowered. In some embodiments, this may be done iteratively.

Actions that embodiments may performed based on identifying a network portion that is at risk (or above a risk threshold) can include changing a VLAN of one or more devices, quarantining a VLAN, or other remediation actions. For example, such actions may be taken if a personal device (e.g., a personal smartphone) is communicatively coupled to an SSID with a medical device.

Embodiments are able to use active scanning and probing and take active actions in response to a network portion risk exceeding a threshold or a network portion that is high risk being able to communicate with a high sensitivity network portion. The active actions can include changing the network portion configuration with respect to one or more devices (e.g., assigning the one or more devices to a different VLAN), blocking the one or more devices from communicating with other devices (e.g., assigning them to a quarantine VLAN).

Embodiments may further take passive actions such as monitoring, logging, or a combination thereof to track communications of one or more high risk devices. The passive actions may further include sending traffic to an intrusion detection system or other communication analysis system (e.g., system 150 or another system as described with respect to FIG. 1). In some embodiments, the passive actions may be performed along with sending a notification to indicate that the traffic of one or more devices is being monitored.

The actions may further include moving high risk entities to a high risk network portion or a quarantine network portion, blocking the entity from communicating with other entities on a network, rerouting device traffic to an intrusion detection system, triggering an update or patch, etc.

Embodiments are configured to support separating devices into various network portions both at the time of network creation or configuration or after the network has been established and embodiments are used to analyze the network. During the initial setup of a network, embodiments may be able to automate the initial configuration of network portions (e.g., VLANs) based on device type, sensitivity, or other factors, as described herein. This can prevent the creation of an initial single network portion (e.g., default VLANs) with each of the entities therein, thereby creating a large attack surface. That is, embodiments can enable the creation of a small attack surface from the beginning.

Embodiments are configured for use with existing networks to analyze and monitor traffic on the network to enable reconfiguring network portions to minimize the attack surface of the network. The contents of or entities within each individual network portion may be determined. The risk may be assessed, as described herein, and a risk with each network portion determined. The risk for each network portion may be determined on a variety of factors including, but not limited to, entity types in the network portion, sensitivity of devices in the network portion, entity risk, credentials, or a combination thereof. The risk associated with each network portion can then be used to determine whether a network portion is well configured. For example, whether a network portion is well configured may be based on each device of the network portion has a similar device context (e.g., functionality, purpose, sensitivity, etc.).

Accordingly, embodiments provide risk reporting on a network portion and entity basis that enables a user to take the most effective action or prioritize action on the most at risk asset(s) and network portion(s) as they address risks throughout the network. Embodiments enable both network portion analysis and drilling down to the entity level via a graphical user interface. Embodiments significantly enable prioritization of action, including automated action, toward one or more portions of a network where risk is the greatest. This may further enable non-expert or less expert users by driving their focus.

Embodiments are able to incorporate account entity context (e.g., based on entities having weak or default credentials) and entity purpose or function (e.g., classification or identification). Embodiments are able to remedy the risks created where network segmentation is performed based on where a device is located (e.g., a specific location or a specific floor) which results in an entity type mix with increased attack surface and high sensitivity devices being with devices of lesser sensitivity levels.

The results of reducing network attack surface can thus have a significant impact in preventing events including stopping output production (e.g., of a factory or fuel system), stopping critical components, reducing or limiting the effectiveness of safety systems, result in significant injury or death to a person or animal, and cost significant amount of money due to downtime. For example, if a safety PLC becomes inoperative due to compromise or attack thereby preventing an alarm from activating or preventing an elevator from stopping at the right location or operating at a safe speed, there can be significant danger to the workers of a site or building. Embodiments can be used be in a variety of environments including, but not limited to, campus, data center, cloud, medical, and operational technology or industrial environments.

Advantageously, embodiments are configured for determining a risk associated with a network portion thereby allowing prioritization on which network portions should be the focus for security actions or monitoring. That is, embodiments enable better use of compliance and security resources within an organization. Resources are thus made available by embodiments to focus on responding to the highest risk or sensitivity security threats and reducing risk in an efficient and effective manner.

Accordingly, described herein in various implementations are systems, methods, techniques, and related technologies, which may perform risk analysis on an entity and network portion basis. As described herein, the use of entity risk and network portion risk can be used to optimize the network portions to reduce the attack surface of one or more network portions.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining a risk for each entity of a network portion and a risk associated with each network portion, as described herein. The risk associated with a network portion can be based on the risk of each entity associated with the network portion, the entity types within the network portion, the sensitivity of one or more entities associated with the network portion, the one or more entity types associated with the network portion, one or more objectives (e.g., selected or configured by a user), and weak or default credentials of one or more of the entities associated with the network portion, as described herein.

Network monitor device 102 may provide an interface (e.g., a graphical user interface (GUI)) for viewing and monitoring risk (e.g., of one or more entities and associated network portion), modifying and configuring risk determination for a network portion, entities associated with the network portion, or a combination thereof. In some embodiments, network monitor device 102 is operable to perform visualization or display (e.g., including tables or matrixes, network graphs, etc.) of risk associated with each entity and the risk associated with each network portion (e.g., segment, VLAN, SSID, etc.).

Network monitor device 102 may further perform a variety of operations including identification, classification, and taking one or more remediation actions (e.g., changing network access of an entity, changing the virtual local area network (VLAN), sending an email, sending a short message service (SMS) message, active actions, passive actions, etc.), as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
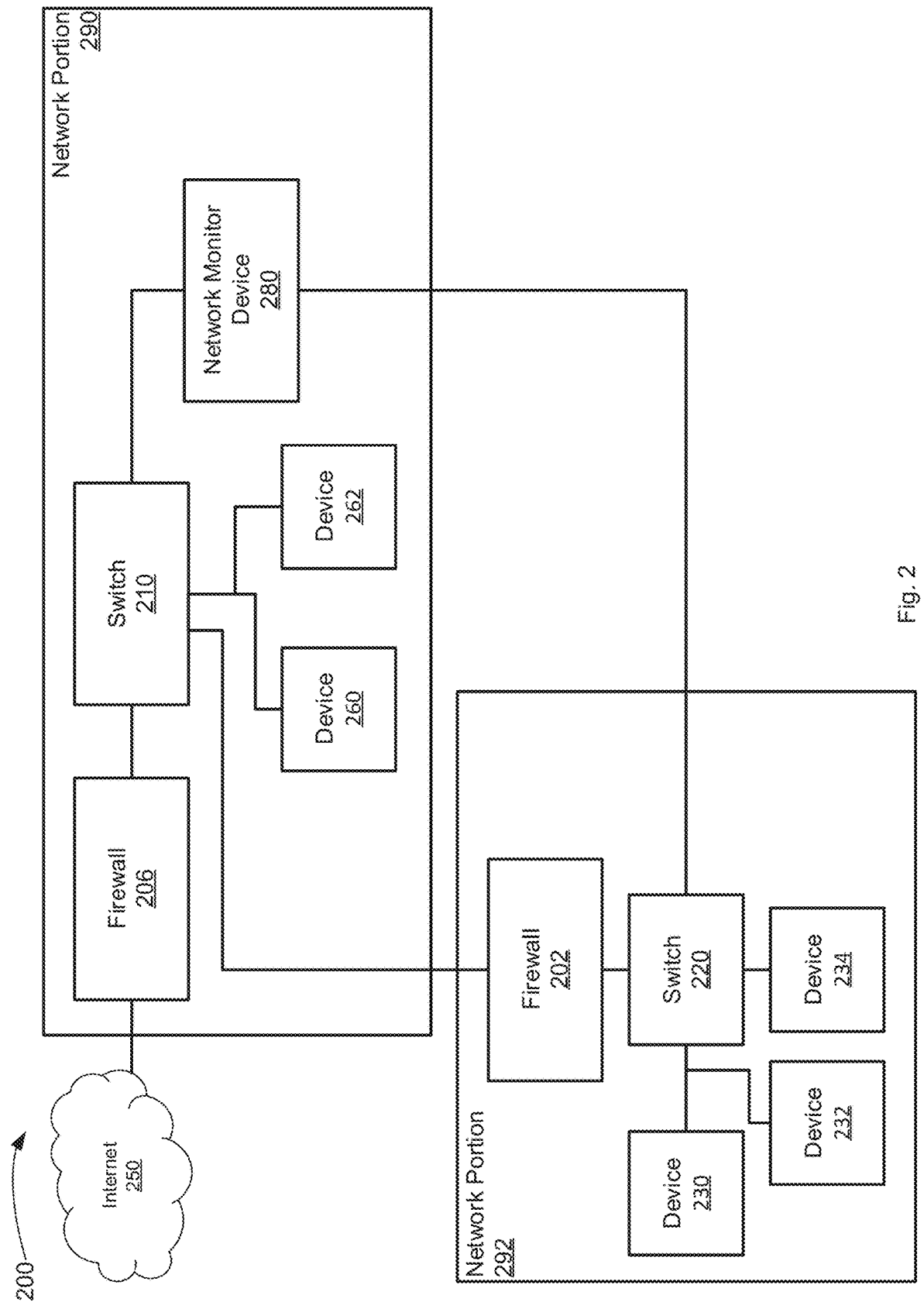
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor device 280 (e.g., network monitor device 102) which may handle risk determination, as described herein, associated with the various entities communicatively coupled to example network 200. Network monitor device 280 can perform risk analysis of entities (e.g., devices 230-234 and 260-262) and use the risk associated with the entities to determine a risk associated with each network portion for example network 200, as described herein. The information gathered by network monitor device 280 can be used for prioritizing risks for mitigation, etc., as described herein.

FIG. 2 shows example devices 230-262 (e.g., devices 106, 122a-b, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein. Enforcement points including firewalls 202-206 and switches 210-220 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar to network monitor device 102. Embodiments support IPv4, IPv6, and other addressing schemes. In some embodiments, network monitor device 280 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor device 280, and devices 230-262. Firewalls 202-206 may perform network address translation (NAT) and firewall 202 may communicatively couple the devices 230-234, which are behind the firewall 202, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210-220 are enforcement points, as described herein.

Network monitor device 280 is configured to identify, classify, determine one or more characteristics of entities (e.g., devices 230-262), determine a risk (e.g., value or score) for each entity, determine a risk associated each network portion of network 200 (e.g., network portions 290-292), or a combination thereof on network 200, as described herein. Network monitor device 280 can access network traffic from network 200 (e.g., via port mirroring or switched port analyzer (SPAN) ports of firewalls 202-206 and switches 210-220). Network monitor device 280 can perform passive scanning of network traffic by observing and accessing portions of packets from the network traffic of network 200. Network monitor device 280 may perform an active scan of an entity of network 200 by sending one or more requests to any entity of network 200. The information from passive and active scans of entities of network 200 can be used to classify, identify, and determine a risk for each entity of network 200, as described herein. The risk determined for each entity may be based on one or more factors including, but not limited to, credentials (e.g., weak or default credentials), one or more vulnerabilities, sensitivity, and objectives, as described herein.

As shown, network 200 includes network portions 290-292. Network portions 290-292 may be VLANs, SSIDs, segments, subnetworks, etc. Network monitor device 280 may determine a respective risk value for each of network portions 290-292 (e.g., based on the risk of the entities within or associated with a network portion, anomalous entity type mix, sensitivity of the entities with the network portion, objectives, etc.), as described herein. Embodiments may further support determining a risk value for groups of entities (e.g., department, division, floor, building, etc.).

For example, if device 230 is a high sensitivity healthcare patient monitor or an infusion pump and device 232 is an IP camera with a HTTP login capability, network monitor device 280 can determine the risk of the network portion 292 as being high risk due to device 232 increasing the attack surface of network portion 292. This can be based on network monitor device 280 being operable to determine an entity type or device type for each of devices 230-234. Network monitor device 280 can determine the device types of device 230 as a healthcare device and device 232 as an OT device. The determination of risk of network portion 292 can be based on the device 230 being a high sensitivity healthcare device and the device type mixture of network portion 292 including healthcare device with OT device (IP camera). Network monitor 280 may further access an objective including that high sensitivity entities should not be in the same network portion as non-high sensitivity devices (e.g., low or moderate sensitivity entities). Network monitor device 280 may thus send a notification, take action, or a combination thereof to change device 232 to another network portion. This may also occur based on the network monitor device 280 determining that device 232 has weak or default credentials, as described herein.

Further, if devices 260-262 are low sensitivity devices and able to communicate with a high sensitivity device 230, network monitor 280 can change the communications configurations of network portions 290-292. For example, via changing ACLs, the communications allowed between network portions 290-292 can be limited based on network portion 292 having high sensitivity devices. As another example, if device 230 is high sensitivity device and it is able to communicate with Internet 250, network monitor 290 can reconfigure one or more firewalls 202-206 and switches 210-220 to prevent device 230 from communicating with Internet 250.

Figure 3:
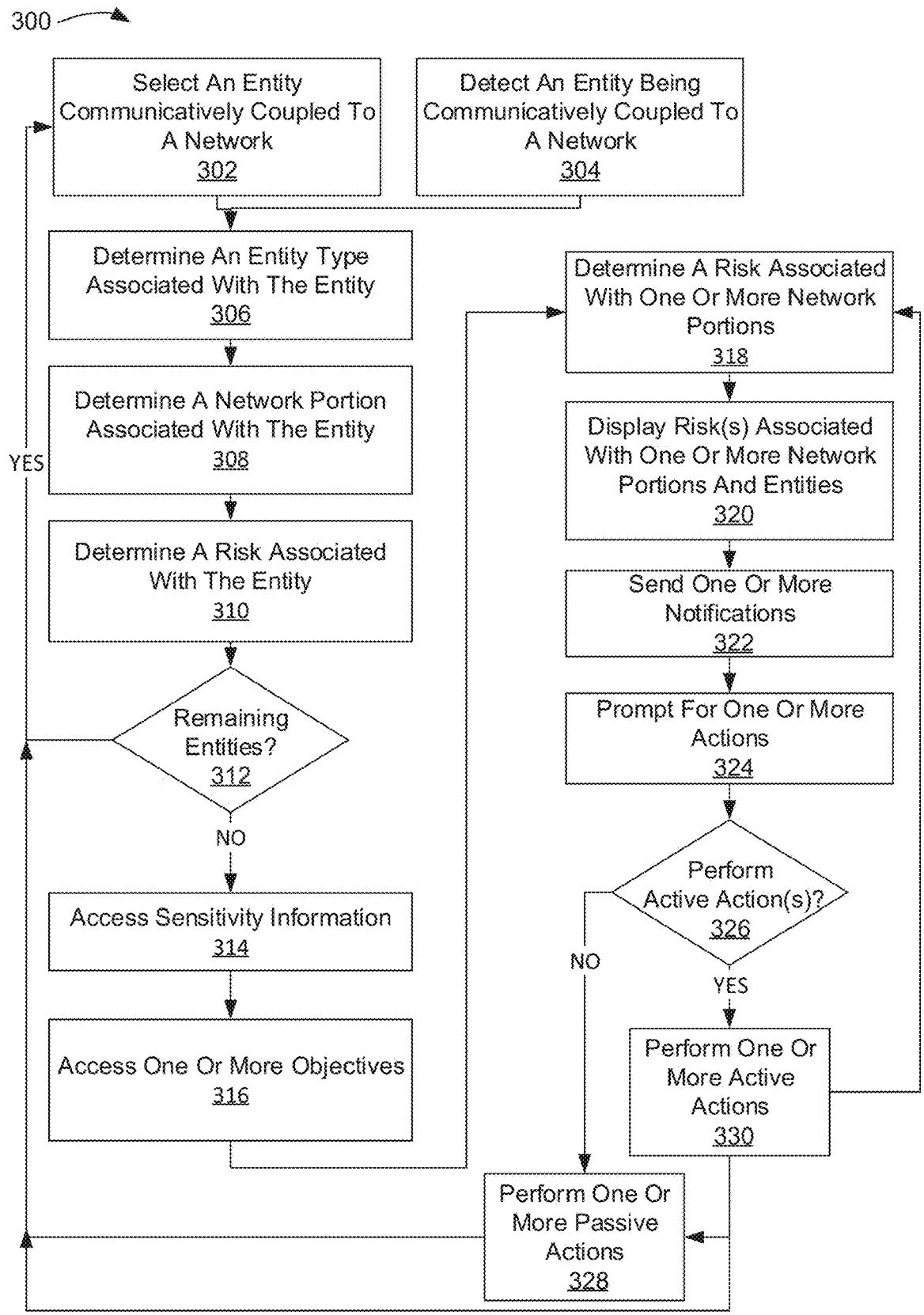
FIG. 3 depicts a flow diagram of aspects of a method for determining a risk associated with a network portion in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for determining a risk associated with a network portion in accordance with one implementation of the present disclosure. Various portions of flowchart 300 may be performed by different components (e.g., components of system 400) of an entity (e.g., network monitor device 102 or network monitor device 280). Flowchart 300 depicts a process for determining a risk associated with one or more entities, risk associated with one or more network portions, and (optionally) performing one or more actions (e.g., in response to risk associated with an entity or a risk associated with a network portion), as described herein.

At block 302, an entity communicatively coupled to a network is selected. The entity may be selected as part of a periodic scan of the network (e.g., a scan of network 100 by network monitoring device 102). The entity may further be selected as part of a continuous, real-time, or combination thereof scan of the network. The entity may be a device, a user, etc., as described herein.

At block 304, an entity being communicatively coupled to the network is detected. The entity may be detected upon being communicatively coupled to the network (e.g., being communicatively coupled to network device 104 or other enforcement point, etc.). The detecting of the entity coupled to the network may include detecting the entity in response to the entity being recoupled or readmitted to the network. This may further include detecting that a user has logged into a machine or the active user account on a device or an entity has changed. The entity that has been detected may be selected for determining a risk score therewith.

At block 306, an entity type associated with the entity is determined. In some embodiments, the device type associated with an entity (e.g., based on the entity being a device) is determined). The entity type or device type may be determined based on one or more classification techniques, one or more identification techniques, or a combination thereof of the entity that may be performed in a variety of manners, as described herein. Entity or device type may be determined using active scanning, passive scanning, or a combination thereof. Active scanning, for example, can include sending queries to an entity or device. Passive scanning, for example, can include monitoring traffic to and from an entity or device.

At block 308, a network portion associated with the entity is determined. The determination of a network portion may be based on information including information accessed from network infrastructure (e.g., one or more switches, routers, wireless access points, firewalls, intrusion detection devices (IDSes), enforcement points, etc.), accessing network traffic, or a combination thereof. One or more packets from communications of an entity or device may be accessed to determine the VLAN, segment, SSID, etc., associated with an entity or device.

At block 310, a risk associated with the entity is determined. The risk associated with entity may be determined, as described herein, e.g., based on one or more CVEs associated with an entity, patch version, software version, etc. As described herein, the risk may further be based on the credentials (e.g., weak or default credentials), security posture, sensitivity associated with an entity, impact of a compromise or attack, probability of a compromise or attack, financial impact of a compromise or attack, etc.

At block 312, whether any entities remain (e.g., to be analyzed for entity type, network portion, or associated) is determined. If there are entities remaining, block 302 may be performed. If there are no entities remaining, block 314 may be performed.

At block 314, sensitivity information is accessed. The sensitivity information may be a list (e.g., a static list, a dynamic list, etc.) or other data structure of the sensitivity (e.g., high sensitivity, moderate sensitivity, or low sensitivity) associated with particular entity types or particular device type. The sensitivity information may be configured by a user, based on a defaults, or a combination thereof and may be based on entity type or particular entities. For example, a particular file server, OT device, or medical device, etc., may be identified in the sensitivity information as being high sensitivity. The sensitivity may further be based on the information that the entity accesses, processes, etc., as described herein. In some embodiments, the sensitivity information may be based on user input, based on one or more policies, a classification library, or other data source.

For example, healthcare devices may automatically be treated as high sensitivity based on device type (e.g., including infusion pumps, MM machines, X-ray machines, etc.). As another example, particular servers in a financial company may be marked or identified as sensitivity and may be independent of the server device types (e.g., backup data server, server made by company X or by company Y, backup power server).

At block 316, one or more objectives are accessed. The objectives may be user configured or selected as default configurations (e.g., as part of a policy). The objectives may include minimizing the entity or device type mix within a network portion (e.g., including mix or variety of sensitive devices in a network portion), minimizing or making substantially similar the sensitivities of entities within a network portion, or minimizing entity or device risk within a network portion, or minimizing the average network portion risk. For example, a healthcare network administrator may have an objective of minimizing the entity type mix so that one or more healthcare entities are not in the same network portion as non-healthcare entities.

At block 318, a risk associated with one or more network portions is determined. The risk associated with a network portion may be based on one or more risks associated with one or more entities or devices associated with the network portion, weak or default credentials, the sensitivity associated with one or more entities or devices associated with the network portion, and the one or more objectives, as described herein.

In some embodiments, the risk associated with the network portion is determined based on the types of entities or devices within a network portion, the risk associated with one or more entities or device associated with the network portions, the sensitivity of each of the one or more entities or devices associated with the network portion, and which other network portions a particular network portion can communicate with.

In some embodiments, one or more objectives are used in determining risk of a network portion. For example, a risk score may be determined for a network portion based on the one or more objectives thereby helping an administrator or other user achieve the one or more objectives including reporting a high risk network portion based on the objective in the case where a single device non-healthcare device is on a network portion with 100 healthcare devices. That might otherwise get reported as a low risk but based on the objective would be reported as a high risk or as a notification with respect to the objective.

At block 320, risks associated with one or more network portions and entities are (optionally) displayed. A graphical user interface (GUI) may be rendered, output, or a combination thereof, depicting the risk associated with each network portion and the risk associated with the entities therein. In some embodiments, information of which VLANs are communicating with other VLANs may be graphically depicted.

For example, if one objective is to keep particular entity types on different network portions, with imaging equipment on a first VLAN, laboratory/diagnostics in another VLAN, and HVAC in another VLAN. Embodiments are able to display graphically a depiction of the network with an indicator of the devices with a type that is inconsistent with the one or more device types of the objective associated with the VLAN.

As another example, a financial customer may have an objective of having high sensitivity servers in a particular VLAN. Embodiments are able to visually depict whether the highly sensitive servers are within a particular VLAN or whether a particular server is within a VLAN that includes less sensitive devices. Embodiments may then enable moving high sensitivity devices not in a high sensitivity network portion to the high sensitivity network portion via changing the network portion of high sensitivity devices that are in a network portion associated with low sensitivity devices.

At block 322, one or more notifications are sent. The notifications may be based on a policy and be any of a variety of notifications, e.g., IT ticket, email, SMS, a HTTP notification, etc., as described herein.

At block 324, prompts for one or more actions may be displayed. The prompts may be part of a GUI or other interface (e.g., command line) and include one or more passive or active actions, allow configuration of one or more actions prior to performance, and allow review of the actions.

At block 326, whether active actions are to be performed is determined. In some embodiments, whether active actions are to be performed may be a user configurable option, or part a policy (e.g., default policy configuration, user defined policy configuration, etc.). If active actions are to be performed, block 330 may be performed. If active actions are not be performed, block 328 may be performed.

At block 328, one or more passive actions are performed. The one or more passive actions may include monitoring or logging communications of one or more entities or a portion of a network portion, sending communications of an entity to another entity (e.g., an IDS, IPS, etc.), as described herein.

At block 330, one or more active actions are performed. The one or more active actions may include reassigning an entity or device to another network portion (e.g., VLAN, SSID, segment, subnet, etc.), removing the entity or device from the connected wireless network and tagging the device as suspicious (or non-compliant), quarantining an entity or device, notifying a user of the device to update the software, trigging an update or an automatic update, etc.

Block 318 may then be performed so as to update the determined risk associated with a network portion. In some embodiments, block 328 may be performed in combination with block 330. Embodiments may support performing one or more passive actions and one or more active actions in combination.

Figure 4:
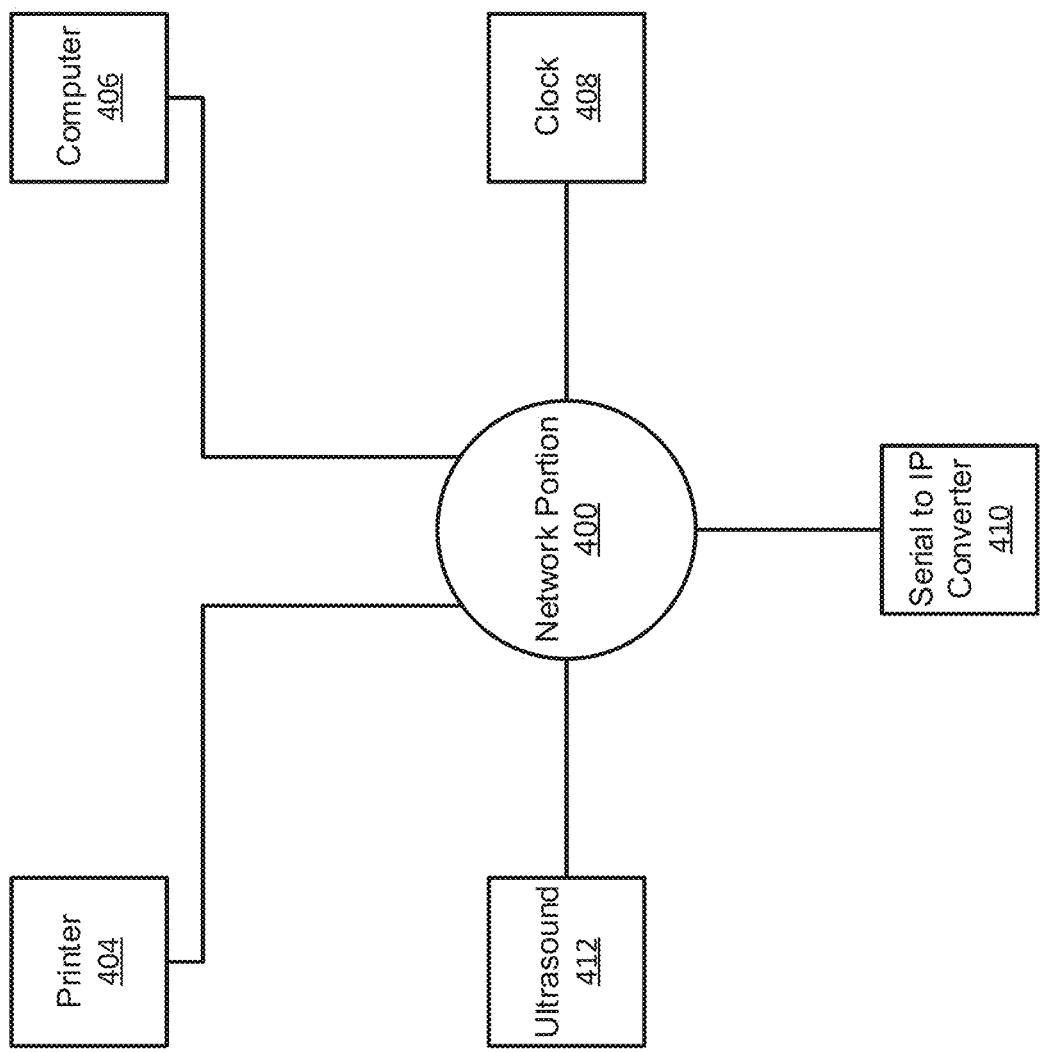
FIG. 4 depicts an example diagram of a network portion and devices associated therewith where a risk is created based on device mixture in accordance with one implementation of the present disclosure.

FIG. 4 depicts an example diagram of a network portion and devices associated therewith where a risk is created based on device mixture in accordance with one implementation of the present disclosure. FIG. 4 shows an example graph of network portion 400 (e.g., VLAN, SSID, segment, subnet, etc.) including a printer 404, a computer 406, an ultrasound device 412, a clock 408, and a serial-to-IP converter 410.

Computer 406 and printer 404 may be associated with the ultrasound machine. Computer 406 may be used to manage the ultrasound device 412. Printer 404 may be a printer for printing ultrasound scans images and computer 406 may be for viewing and a controlling ultrasound device 412. Serial-to-IP converter 410 may be for communicatively coupling one or more serial healthcare devices, e.g., ultrasound device 412, to a computing workstation (e.g., computer 406) or a network. Printer 404, computer 406, ultrasound device 412, and serial-to-IP converter 410, thus may all be high sensitivity devices due to being healthcare devices (e.g., based classification, a user defined sensitivity list, etc.). It is appreciated that the security status of the general-purpose computing equipment, e.g., computer 406, can directly affect the security status of the specialized healthcare devices on the same network portion.

Clock 408 is low sensitivity, unrelated to the healthcare devices, may be vulnerable (e.g., unpatched), and act as a weakness in the network portion which can potentially affect the other critical healthcare devices (e.g., ultrasound device 412). A vulnerability in clock 408 may be exploited or used to exploit vulnerabilities of other devices of network portion 402 or used to launch attacks or move laterally. Therefore to reduce or neutralize the threat to the ultrasound device 412 and associated devices, embodiments can perform an action to change the VLAN or network portion that clock 408 is on, firewall off clock 408 from the healthcare devices, or other action(s), a combination thereof, as described herein. In some embodiments, clock 408 may represent an improper or inconsistent entity type mix with respect to a network portion or an objective.

Figure 5:
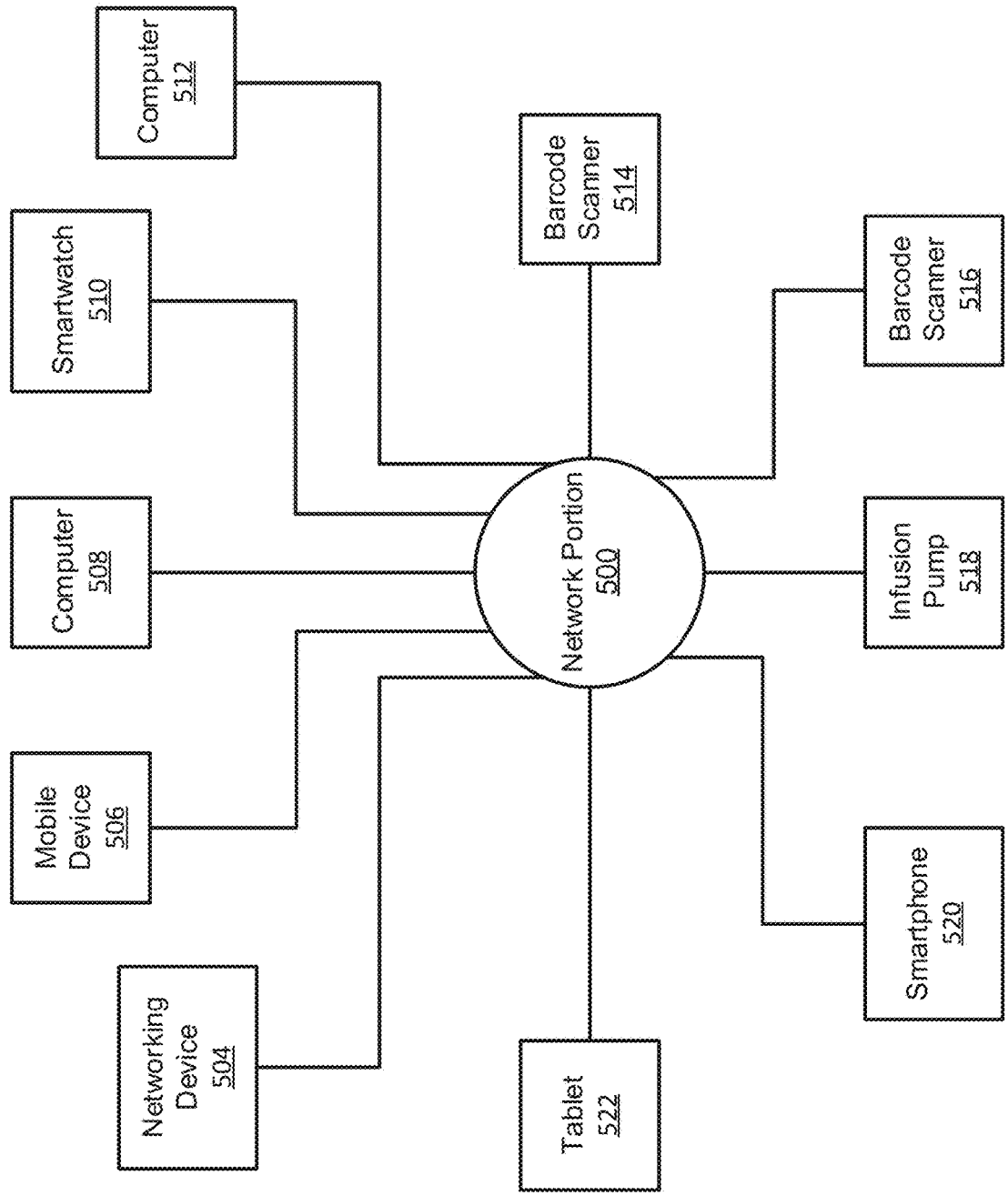
FIG. 5 depicts an example diagram of a network portion and devices associated therewith where a risk is created based on a personal device in accordance with one implementation of the present disclosure.

FIG. 5 depicts an example diagram of a network portion and devices associated therewith where a risk is created based on a personal device in accordance with one implementation of the present disclosure. FIG. 5 shows an example graph of network portion 500 (e.g., VLAN, SSID, segment, subnet, etc.) where a smartwatch 510 is communicatively coupled to a network portion with an infusion pump and other sensitive medical devices.

Example network portion 500 is a VLAN and includes or is associated with a networking device 504 (e.g., switch, router, firewall, etc.), a mobile device 506, a computer 508, a smartwatch 510, a computer 512, a barcode scanner 514, a barcode scanner 516, an infusion pump 518, a smartphone 520, and a tablet 522. Mobile device 506 (e.g., smartphone for accessing medical information), computer 508 (e.g., for accessing medical information), computer 512 (e.g., for controlling infusion pump 518), barcode scanner 514 (e.g., for scanning medical bracelet bar codes), barcode scanner 516 (e.g., for scanning pharmaceutical bar codes), infusion pump 518, smartphone 520 (e.g., for tracking pharmaceutical distribution), and tablet 522 (e.g., for viewing and modifying patient records) may each be healthcare devices and be considered highly sensitivity. Infusion pump 518 is a highly sensitive medical device that delivers fluids, such as nutrients and medications, into a patient's body in controlled amounts, which makes compromise particularly dangerous. Smartwatch 510 may be a doctor's, a nurse's, or a patient's personal smartwatch.

Smartwatch 510 which may further be connected to a personal device of a patient or a healthcare worker should not be network portion 500 due smartwatch 510 not being a high sensitivity. Smartwatch 510 further increases risk for network portion 500 due to smartwatch 510 having its own respective set of different vulnerabilities from the other devices of network portion 500.

Embodiments are able to identify and notify when potential personal devices (e.g., smartphones, smartwatches, tablets, etc.) or OT devices (e.g., IP cameras) are present on the same network portion as sensitive equipment (e.g., sensitive healthcare equipment).

Embodiments are operable to determine that smartwatch 510 should not be communicatively coupled to same network portion as the infusion pump (e.g., due to this being risky, bad network hygiene, etc.) and other healthcare devices. Embodiments may determine this based on the other devices in network portion 500 being medical devices while the smartwatch is not a medical device.

Embodiments are thus operable to identify personal and guest devices (e.g., smartwatch 510) and depending on configuration, move the personal or guest devices (e.g., smartwatch 510) to another network portion, e.g., a guest devices network portion, from the network with the medical devices.

Embodiments may further identify the barcode scanner 516 as facilities equipment (e.g., pharmacy equipment) and change the network portion of barcode scanner 516 to a facilities network portion (e.g., pharmacy VLAN). Embodiments may further configure network infrastructure (e.g., one or more enforcement points) so that the facilities network portion and the guest devices network portion do not allow communication with healthcare network portion 500 including infusion pump 518.

Figure 6:
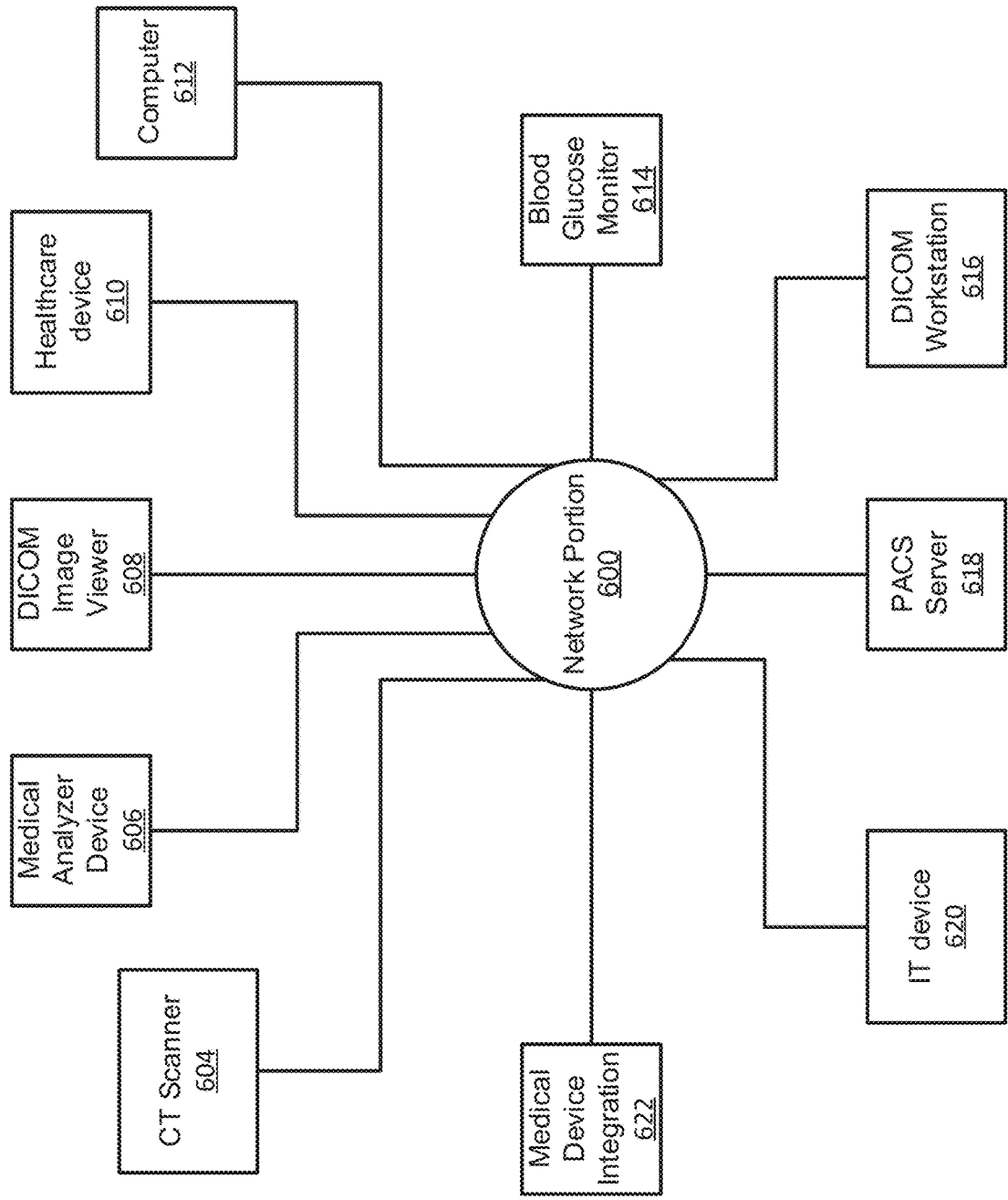
FIG. 6 depicts an example diagram of a network portion and devices associated therewith where a device has weak credentials in accordance with one implementation of the present disclosure.

FIG. 6 depicts an example diagram of a network portion and devices associated therewith where a device has weak credentials in accordance with one implementation of the present disclosure. Weak or default credentials present a significant risk, as described herein. FIG. 6 shows an example graph of network portion 600 (e.g., VLAN, SSID, segment, subnet, etc.) including a computed tomography (CT) scanner 604, a medical analyzer device 606, a digital imaging and communications in medicine (DICOM) image viewer 608, a healthcare device 610, a computer 612, a blood glucose monitor 614, a DICOM workstation 616, a picture archiving and communication system (PACS) server 618, an IT device 620, and a medical device integration device 622.

CT scanner 604 is for performing CT scans of patients. Medical analyzer device 606 is operable for allowing hospital to analyze one or more images from CT scanner 604. Digital imaging and communications in medicine (DICOM) image viewer 608 is operable to allow medical personnel to view images (e.g., CT scan images from PACS server 618). Healthcare device 610 is operable for monitoring the vital signs, e.g., blood pressure and blood oxygen saturation level of patients. Computer 612 is for controlling CT scanner 604. Blood glucose monitor 614 is operable for monitoring blood glucose levels of a patient. Picture archiving and communication system (PACS) server 618 is configured for archiving images of CT scans and communicating with CT scanner 604 and optionally other entities of network portion 600. DICOM workstation 616 is operable accessing images of PACS server 618. IT device 620 is a printer used to print and analyze the CT scanned images. Medical device integration device 622 is used to retrieve patient details, e.g., patient's name, diagnosis, previous medical records, etc.

Embodiments are able to identify and flag IoT equipment (and other entities) which have weak or default passwords with high accuracy. This allows identification of specific instances where in some network portions have production healthcare equipment (e.g., specifically patient monitors and CT scanner 604) with default or weak credentials along with other IT and IoT equipment. In such a situation, the healthcare device itself acts as a weak link or vulnerable portion in the network portion.

For example, there are a surprising number of IoT systems with default passwords in production environments. If compromised, these devices can act as a spring board for the attacker and can allow immediate lateral movement within a network portion. It is important to proactively identify if there are such vulnerable IoT equipment in a network to determine the security status of a network portion.

With respect to network design and the entities within network portion 600, network portion 600 is properly configured as a network portion 600 that include medical devices. It is appreciated that even if a network portion is properly designed based on device purpose and sensitivity, having a poorly configured device with a default or weak credentials login can compromise the network portion. For example, where CT scanner 604 in the network portion with default credentials causes the entire network portion 600 to be vulnerable. Thus, is it not enough to just properly design or configure the network portion, (proactive) awareness about an entity's current security status and their configuration is important. Embodiments thus enable dynamic assignment of devices to other network portions based on their security status and purpose in the network.

Embodiments are able to determine that CT scanner 604 has default credentials, as described herein, and as such create a vulnerability in network portion 600. The risk for network portion 600 may thus be high risk because of the default credentials and the high sensitivity of the entities of network portion 600. Embodiments may depict this visually by showing a high risk associated with network portion 600 and CT scanner 604 and the contribution of CT scanner 604 to the high risk of network portion 600.

Figure 7:
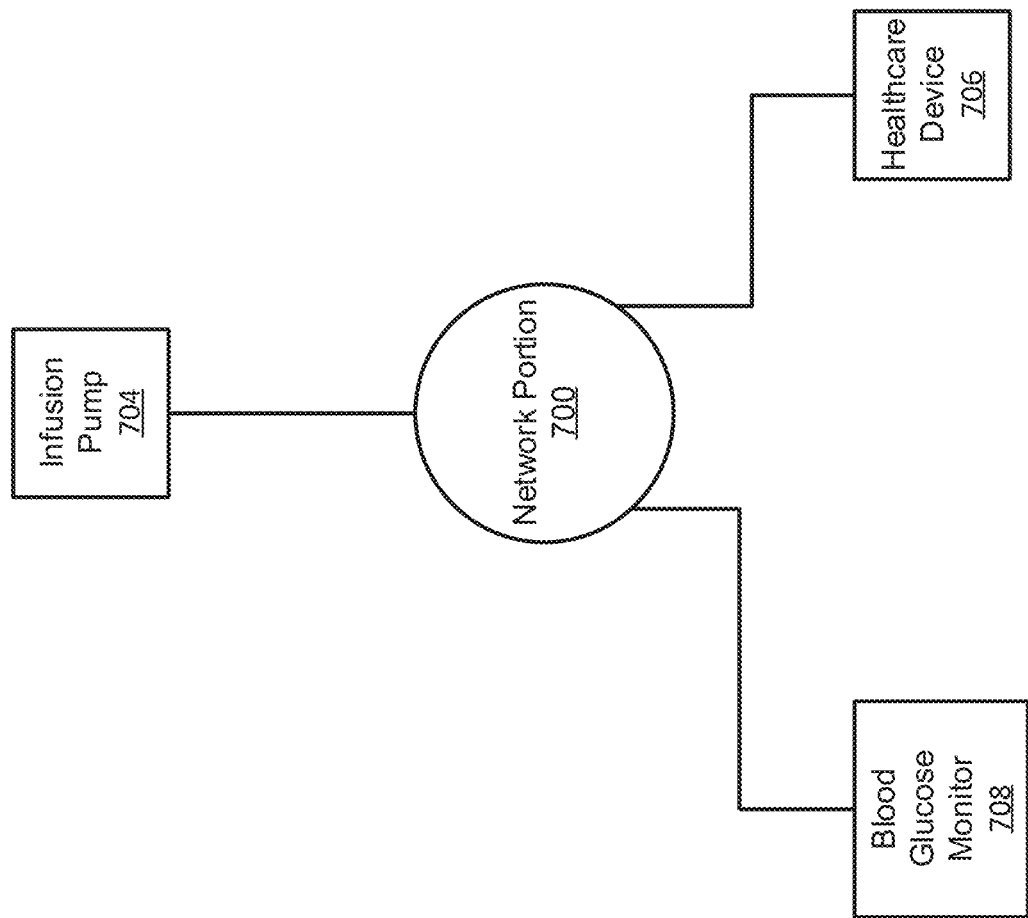
FIG. 7 depicts an example diagram of a network portion and devices associated therewith that is segmented based on device type in accordance with one implementation of the present disclosure.

FIG. 7 depicts an example diagram of a network portion and devices associated therewith that is segmented based on device type in accordance with one implementation of the present disclosure. FIG. 7 depicts an example graph of network portion 700 (e.g., VLAN, SSID, segment, subnet, etc.) having healthcare devices and being properly segmented. Network portion 700 includes infusion pump 704, healthcare device 706, and blood glucose monitor 708. Network portion 700 can be considered as properly configured with respect to the entities within network portion 700 due to the devices being high sensitivity healthcare devices. If network portion 700, and the entities therein, are restricted from communicating with other non-healthcare entities or entities with different sensitivity levels, then network portion 700 may be considered configured properly.

Embodiments may separate or apportion a healthcare network into a variety of network portions including, but not limited to, clinical services, biomedical engineering, medical devices, database servers, enterprise services, guest services, etc. Purpose driven network portions can allow limited or no communication between entities in sensitive network portions and devices in low-trust zones (e.g., guest networks). Each of these network portions can be further separated into network portions based on the number of devices and their sensitivity. This can advantageously isolate healthcare entities and prevent vulnerable entities from communicating with the sensitive devices.

As another example, for infusion pumps, embodiments may configure a network portion to include the infusion pumps and access points communicatively coupling the pumps to servers that contain patient-related or dosage related information. The infusion pumps may be behind a dedicated network infrastructure entity (e.g., a switch or other enforcement point) which isolates the infusion pump network portion from other entities and network portions. The access points may have a dedicated SSID that is for exclusive use by the infusion pumps. Communication between the infusion pumps and servers can be limited to specific set of flows that are dedicated to proper operating of the infusion pumps. Such a network segmentation protects the infusion pumps from outside threats and ensures patient safety.

Figure 8:
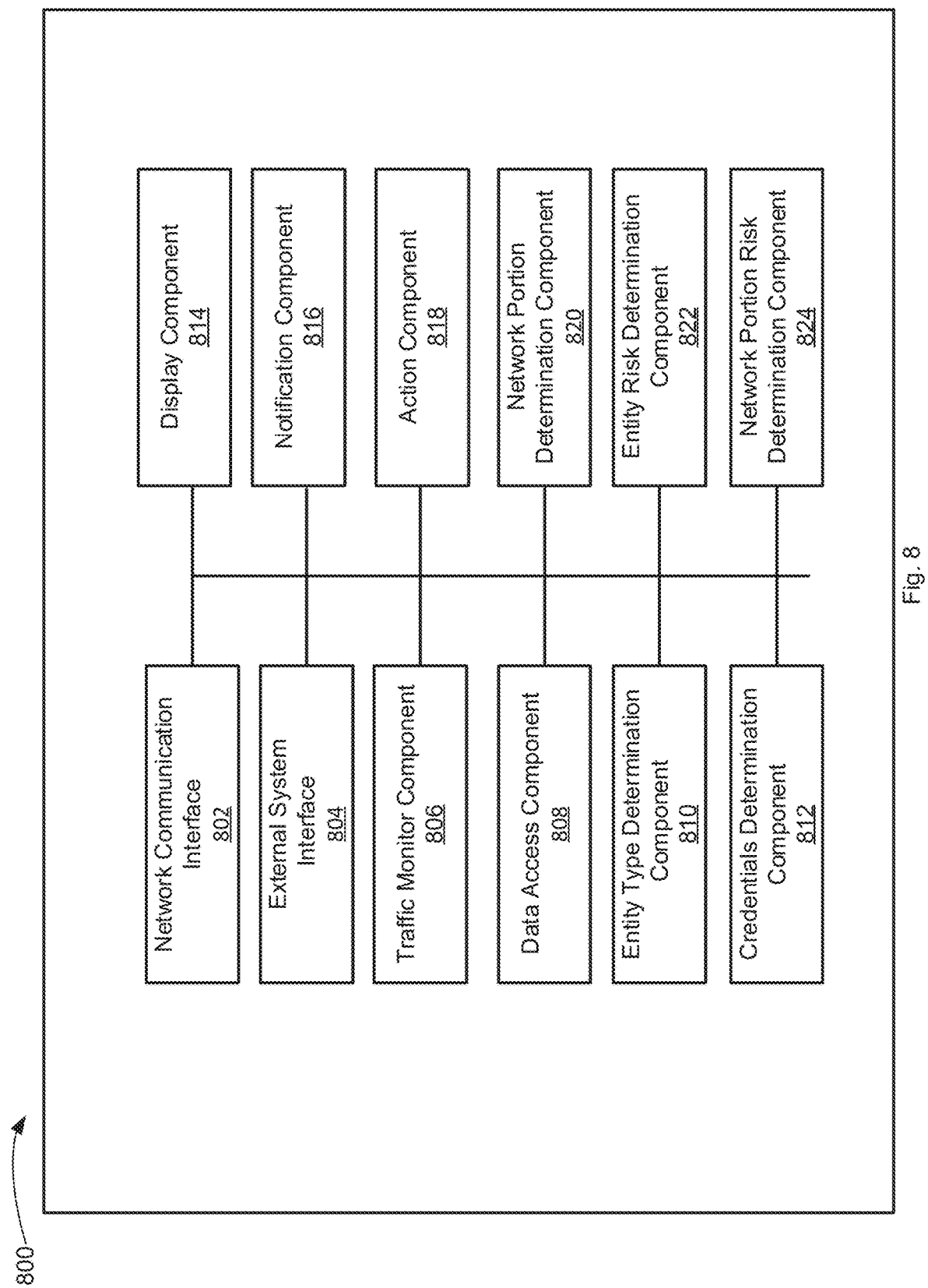
FIG. 8 depicts illustrative components of a system for determining a risk associated with one or more entities and one or more network portions in accordance with one implementation of the present disclosure.

FIG. 8 illustrates example components used by various embodiments. Although specific components are disclosed in system 800, it should be appreciated that such components are examples. That is, embodiments are well suited to having various other components or variations of the components recited in system 800. It is appreciated that the components in system 800 may operate with other components than those presented, and that not all of the components of system 800 may be required to achieve the goals of system 800.

FIG. 8 depicts illustrative components of a system for determining a risk associated with one or more entities and one or more network portions in accordance with one implementation of the present disclosure. Example system 800 or risk analyzer 800 includes a network communication interface 802, an external system interface 804, a traffic monitor component 806, a data access component 808, an entity type determination component 810, a credentials determination component 812, a display component 814, a notification component 816, an action component 818, a network portion determination component 820, an entity risk determination component 822, and a network portion risk determination component 824. The components of system 800 may be part of a computing system or other electronic device (e.g., network monitor device 102 or network monitor device 280) or a virtual machine or device and be operable to monitor and one or more entities communicatively coupled to a network, monitor network traffic, and perform determine comprehensive risk scores, as described herein. For example, the system 800 may further include a memory and a processing device, operatively coupled to the memory, which may perform the operations of or execute the components of system 800. The components of system 800 may access various data and characteristics associated with an entity (e.g., network communication information), data associated with one or more entities, sensitivity information, one or more objectives, etc., as described herein. It is appreciated that the modular nature of system 800 may allow the components to be independent and allow flexibility to enable or disable individual components or to extend, upgrade, or combination thereof components without affecting other components thereby providing scalability and extensibility. System 800 may perform one or more blocks of flow diagram 300.

Communication interface 802 is operable to communicate with one or more entities (e.g., network device 104, firewalls 202-206, switches 210-220, other devices coupled thereto, devices 230-262, etc.) coupled to a network that are coupled to system 800 and receive or access information about entities (e.g., device information, device communications, device characteristics, etc.), access information as part of a passive scan, send one or more requests as part of an active scan, receive active scan results or responses (e.g., responses to requests), as described herein. The communication interface 802 may be operable to work with one or more components to initiate access to characteristics or determination of characteristics of an entity to allow determination of one or more attributes which may then be used for device compliance, asset management, standards compliance, classification, identification, etc., as described herein. Communication interface 802 may be used to receive and store network traffic for determining device attributes, as described herein.

External system interface 804 is operable to communicate with one or more third party, remote, or external systems to access information including characteristics or attributes about an entity. External system interface 804 may further store the accessed information in a data store. For example, external system interface 804 may access information from a vulnerability assessment (VA) system to enable determination of one or more compliance or risk characteristics associated with the entity. External system interface 804 may be operable to communicate with a vulnerability assessment (VA) system, an advanced threat detection (ATD) system, a mobile device management (MDM) system, a firewall (FW) system, a switch system, an access point (AP) system, etc. External system interface 804 may query a third party system using an API or CLI. For example, external system interface 804 may query a firewall or a switch for information (e.g., network session information) about an entity or for a list of entities that are communicatively coupled to the firewall or switch and communications associated therewith. In some embodiments, external system interface 804 may query a switch, a firewall, or other system for information of communications associated with an entity.

Traffic monitor component 806 is operable to monitor network traffic to determine if a new entity has joined the network or an entity has rejoined the network and monitor traffic for analysis by entity type determination component 810, credentials determination component 812, network portion determination component 820, entity risk determination component 822, and network portion risk determination component 824, among others, as described herein. Traffic monitor component 806 may have a packet engine operable to access packets of network traffic (e.g., passively) and analyze the network traffic. The traffic monitor component 806 may further be able to access and analyze traffic logs from one or more entities (e.g., network device 104, system 150, or aggregation device 106) or from an entity being monitored. The traffic monitor component 806 may further be able to access traffic analysis data associated with an entity being monitored, e.g., where the traffic analysis is performed by a third party system.

Data access component 808 is operable for accessing data including objectives and sensitivity information, as described herein, for use by other components of system 800 (e.g., entity risk determination component 822 and network portion risk determination component 824 to calculate risk associated with a network portion).

Entity type determination component 810 is operable to determine an entity type associated with each entity, as described herein. In some embodiments, the entity type determination is based on classification and identification of each entity, as described herein.

Credentials determination component 812 is operable to determine if an entity has weak or default credentials, as described herein. In some embodiments, credentials determination component 812 is operable to determine whether an entity has weak or default credentials based on the entity type determined by entity type determination component 810. This allows the range of default credentials to be narrowed based on the entity type thereby accelerating the determination of the weak or default credentials for an entity.

Display component 814 is configured to optionally display one or more graphical user interfaces or other interfaces (e.g., command line interface) for depicting various information associated with entities or devices, risk associated with one or more entities, risks associated with one or more network portions, sensitivity information, one or more objectives, alerts, asset management, and compliance with standards and other policies, etc., as described herein. In some embodiments, display component 814 may display or render a network graph of entities, attributes associated with each entity or device, risk values associated with one or more entities and network portions, and indications of security policy alerts, compliance alerts, etc.

Notification component 816 is operable to initiate one or more notifications based on the results of monitoring communications or attributes of one or more entities (e.g., alerting of a new devices or high risk values, etc.), as described herein. The notification may be any of a variety of notifications, e.g., IT ticket, email, SMS, a HTTP notification, etc., as described herein.

Action component 818 is operable for initiating or triggering one or more remediation actions or security actions according to one or more policies, e.g., based on one or more risk values, as described herein. Action component 818 may further be configured to perform other operations including checking compliance status, finding open ports, etc. Action component 818 may restrict network access, signal a patch system or service, signal an update system or service, etc., as described herein. The action component 818 may thus, among other things, invoke automatically patching, automatically updating, and automatically restrict network access of an entity (e.g., that has out-of-date software or based on access rule violation or attempted violation), automatic change of an entity to another network portion, as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Network portion determination component 820 is operable to determine a network portion (e.g., VLAN, SSID, switch, etc.) associated with an entity, as described herein. Entity risk determination component 822 is operable to determine a risk associated with an entity based on a variety of factors (e.g., CVEs, credentials determined by credentials determination component 812, patch version, software version, etc.), as described herein.

Network portion risk determination component 824 is operable to determine a risk associated with a network portion (e.g., VLAN, SSID, segment, etc.), as described herein. In some embodiments, network portion risk determination component 824 determines the risk associated with a network portion based on one or more risks associated with one or more entities, credentials determined by credentials determination component 812, the sensitivity of one or more entities associated with network portion, and one or more objectives (e.g., available from the data access component 808). Communications with other network portions may be analyzed and used in determining the risk associated with a network portion, as described herein.

The system 800 may be software stored on a non-transitory computer readable medium having instructions encoded thereon that, when executed by a processing device, cause the processing device to access network traffic from a network and determine an entity type associated with at least one entity communicatively coupled to the network. The instructions may further cause the processing device to determine a network portion associated with the at least one entity and determine a risk associated with the at least one entity. The instructions may further cause the processing device to determine a risk associated with the network portion associated with the at least one entity based on the risk associated with the at least one entity and store the risk associated with the network portion.

In some embodiments, the network portion is at least one of a virtual local access network (VLAN), a service set identifier (SSID), or a segment. In various embodiments, the instructions may further cause the processing device to perform an action based on the risk associated with the network portion. In some embodiments, the action comprises at least one of changing a VLAN associated with the at least one entity, quarantining the at least one entity, initiating an update, tracking traffic of the at least one entity, or sending a notification associated with the at least one entity. In various embodiments, the risk associated with the at least one entity is based on at least one of a CVE associated with the at least one entity, patch version, software version, security posture, or credentials. In some embodiments, the risk associated with the at least one entity is based on a sensitivity associated with the at least one entity. In various embodiments, the risk associated with the at least one entity is based on an objective associated with at least one of entity risk, entity sensitivity, or entity types in the network portion. In some embodiments, the risk associated with the network portion is based on a sensitivity associated with the at least one device.

Figure 9:
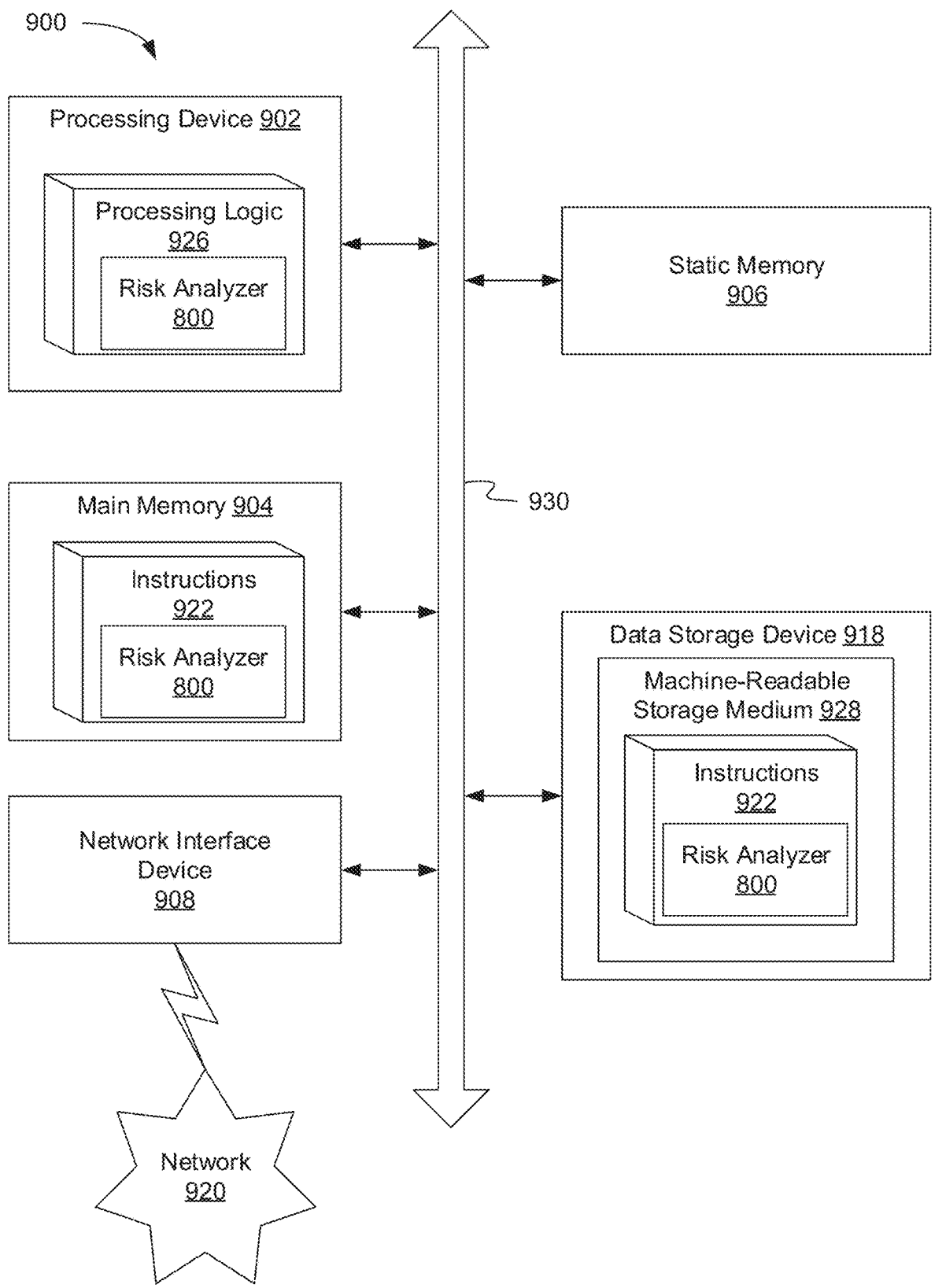
FIG. 9 is a block diagram illustrating an example computer system, in accordance with one implementation of the present disclosure.

FIG. 9 is a block diagram illustrating an example computer system, in accordance with one implementation of the present disclosure. FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server, such as network monitor device 102 running risk analyzer 800 to perform risk analysis of one or more entities and one or more network portions, as described herein.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926, which may be one example of risk analyzer 800 shown in FIG. 8, for performing the operations and steps discussed herein.

The data storage device 918 may include a machine-readable storage medium 928, on which is stored one or more set of instructions 922 (e.g., software) embodying any one or more of the methodologies of operations described herein, including instructions to cause the processing device 902 to execute risk analyzer 800. The instructions 922 may also reside, completely or at least partially, within the main memory 904 or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method for risk determination, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein.

These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
accessing network traffic from a network;
determining an entity type associated with at least one entity communicatively coupled to the network;
determining a network portion including the at least one entity;
determining a risk associated with the at least one entity based on an impact of a potential attack on the at least one entity and a probability of the potential attack occurring with respect to the at least one entity;
determining, by a processing device and after determining the risk associated with the at least one entity, a risk associated with the network portion including the at least one entity based on the risk associated with the at least one entity;
storing the risk associated with the network portion; and
performing an action to reduce an attack surface of the network portion for the potential attack based on the risk associated with the network portion.

2. The method of claim 1, wherein the risk associated with the at least one entity is based on at least one of a Common Vulnerabilities and Exposures (CVE) associated with the at least one entity, patch version, software version, security posture, or credentials.

3. The method of claim 1 wherein the action comprises at least one of changing a VLAN associated with the at least one entity, quarantining the at least one entity, initiating an update, tracking traffic of the at least one entity, or sending a notification associated with the at least one entity.

4. The method of claim 1, wherein determining the risk associated with the at least one entity is based on the entity type associated with the at least one entity.

5. The method of claim 1, wherein the at least one entity comprises a plurality of entities and wherein the risk associated with the network portion including the plurality of entities is based on the risk for each of the plurality of entities.

6. The method of claim 1, wherein the risk associated with the at least one entity is based on a sensitivity associated with the at least one entity.

7. The method of claim 1, wherein the risk associated with the at least one entity is based on an objective associated with at least one of entity risk, entity sensitivity, or entity types in the network portion.

8. The method of claim 1, wherein the risk associated with the network portion is based on a sensitivity associated with the at least one entity.

9. A system comprising:
a memory; and
a processing device, operatively coupled to the memory, to:
access network traffic from a network;
determine an entity type associated with at least one entity communicatively coupled to the network;
determine a network portion including the at least one entity;
determine a risk associated with the at least one entity based on an impact of a potential attack on the at least one entity and a probability of the potential attack occurring with respect to the at least one entity;
determine, after the determination of the risk associated with the at least one entity, a risk associated with the network portion including the at least one entity based on the risk associated with the at least one entity;
store the risk associated with the network portion; and
perform an action to reduce an attack surface of the network portion for the potential attack based on the risk associated with the network portion.

10. The system of claim 9, wherein the risk associated with the at least one entity is based on at least one of a Common Vulnerabilities and Exposures (CVE) associated with the at least one entity, patch version, software version, security posture, or credentials.

11. The system of claim 9, wherein the action comprises at least one of changing a VLAN associated with the at least one entity, quarantining the at least one entity, initiating an update, tracking traffic of the at least one entity, or sending a notification associated with the at least one entity.

12. The system of claim 9, wherein determining the risk associated with the at least one entity is based on the entity type associated with the at least one entity.

13. The system of claim 9, wherein the at least one entity comprises a plurality of entities and wherein the risk associated with the network portion including the plurality of entities is based on the risk for each of the plurality of entities.

14. The system of claim 9, wherein the risk associated with the at least one entity is based on a sensitivity associated with the at least one entity.

15. The system of claim 9, wherein the risk associated with the at least one entity is based on an objective associated with at least one of entity risk, entity sensitivity, or entity types in the network portion.

16. The system of claim 9, wherein the risk associated with the network portion is based on a sensitivity associated with the at least one entity.

17. A non-transitory computer readable medium having instructions encoded thereon that, when executed by a processing device, cause the processing device to:
- access network traffic from a network;
- determine an entity type associated with at least one entity communicatively coupled to the network;
- determine a network portion including the at least one entity;
- determine a risk associated with the at least one entity based on an impact of a potential attack on the at least one entity and a probability of the potential attack occurring with respect to the at least one entity;
- determine, by the processing device and after the determination of the risk associated with the at least one entity, a risk associated with the network portion including the at least one entity based on the risk associated with the at least one entity;
- store the risk associated with the network portion; and
- perform an action to reduce an attack surface of the network portion for the potential attack based on the risk associated with the network portion.

18. The non-transitory computer readable medium of claim 17, wherein the action comprises at least one of changing a VLAN associated with the at least one entity, quarantining the at least one entity, initiating an update, tracking traffic of the at least one entity, or sending a notification associated with the at least one entity.

19. The non-transitory computer readable medium of claim 17, wherein the risk associated with the at least one entity is based on at least one of a Common Vulnerabilities and Exposures (CVE) associated with the at least one entity, patch version, software version, security posture, or credentials.

20. The non-transitory computer readable medium of claim 17, wherein the risk associated with the network portion is based on a sensitivity associated with the at least one entity and wherein the risk associated with the at least one entity is based on the sensitivity associated with the at least one entity.

* * * * *